(12) United States Patent
Shirai (10) Patent No.: US 10,106,216 B2
(45) Date of Patent: Oct. 23, 2018

(54) BICYCLE SEATPOST ASSEMBLY WITH CABLE CONNECTING DEVICE

(71) Applicant: SHIMANO INC., Sakai-shi, Osaka (JP)

(72) Inventor: Toyoto Shirai, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 566 days.

(21) Appl. No.: 14/622,715

(22) Filed: Feb. 13, 2015

(65) Prior Publication Data
US 2016/0236739 A1    Aug. 18, 2016

(51) Int. Cl.
*B62J 1/08*    (2006.01)
*B62K 19/36*    (2006.01)
*F16G 11/10*    (2006.01)
*B62J 1/28*    (2006.01)

(52) U.S. Cl.
CPC .............. *B62J 1/08* (2013.01); *B62K 19/36* (2013.01); *F16G 11/105* (2013.01); *B62J 1/28* (2013.01); *B62J 2001/085* (2013.01)

(58) Field of Classification Search
CPC ....... B62K 19/36; B62J 2001/085; B62J 1/08; B62J 1/28; F16G 11/105; F16C 1/101; F16C 1/12; F16C 1/14; F16C 1/145; F16C 1/16; F16C 1/22; F16C 1/223; F16C 1/226
See application file for complete search history.

(56) References Cited

U.S. PATENT DOCUMENTS

| | | | | |
|---|---|---|---|---|
| 2,644,504 A * | 7/1953 | Millard | .................. | B62K 19/36 267/132 |
| 3,513,719 A * | 5/1970 | Tschanz | .................. | F16C 1/226 464/173 |
| 4,156,371 A * | 5/1979 | Juy | .................. | B62M 25/04 74/146 |
| 4,226,435 A * | 10/1980 | Efros | .................. | B62K 19/36 280/201 |
| 4,807,856 A * | 2/1989 | Teckenbrock | .................. | B62K 19/36 188/67 |
| 5,149,034 A * | 9/1992 | Ganaja | .................. | B62K 19/36 248/178.1 |
| 5,377,556 A * | 1/1995 | Byrnes | .................. | F16G 11/12 74/500.5 |

(Continued)

FOREIGN PATENT DOCUMENTS

AU    2014100360 A4    8/2014
DE    10246502 A1 *    4/2004    .............. F16C 1/101

(Continued)

*Primary Examiner* — Matthieu F Setliff
(74) *Attorney, Agent, or Firm* — Alleman Hall Creasman & Tuttle LLP (57) ABSTRACT

A first cylinder, a second cylinder configured to be telescopically received therein are provided, a positioner configured to relatively position the first cylinder and the second cylinder, an operator configured to be mounted to a bicycle and operatively coupled to the positioner, and a control cable. The control cable may include an outer casing, a first cable having a first end and a second end and configured to be operatively connected to the positioner at the first end, and a second cable having a third end and a fourth end. The second cable may be configured to be operatively connected to the operator at the third end. A cable connector may be configured to connect the second end of the first cable and the fourth end of the second cable.

10 Claims, 7 Drawing Sheets

(56) References Cited

U.S. PATENT DOCUMENTS

| | | | | |
|---|---|---|---|---|
| 5,575,180 A * | 11/1996 | Simon | F16C 1/101 | 403/329 |
| 5,713,555 A * | 2/1998 | Zurfluh | B62J 1/06 | 248/599 |
| 5,826,935 A * | 10/1998 | DeFreitas | B62J 1/06 | 248/404 |
| 6,056,020 A * | 5/2000 | Malone | F16C 1/101 | 138/109 |
| 6,102,609 A * | 8/2000 | Tsuge | F16C 1/101 | 403/301 |
| 6,279,415 B1 * | 8/2001 | Chance | F16C 1/22 | 74/500.5 |
| 6,354,557 B1 * | 3/2002 | Walsh | B62J 1/08 | 248/408 |
| 7,025,522 B2 * | 4/2006 | Sicz | B62J 1/08 | 248/188.5 |
| 7,422,224 B2 * | 9/2008 | Sicz | B62J 1/06 | 248/408 |
| 7,469,617 B2 * | 12/2008 | Basile | F16C 1/22 | 74/501.5 R |
| 7,609,924 B2 * | 10/2009 | Anderson | F16C 1/101 | 385/100 |
| 7,640,825 B2 * | 1/2010 | Basile | F16C 1/22 | 74/501.5 R |
| 7,909,348 B2 * | 3/2011 | Klieber | B62K 19/36 | 280/281.1 |
| 8,079,772 B1 * | 12/2011 | Brennan | B62J 1/08 | 403/109.1 |
| 8,136,877 B2 * | 3/2012 | Walsh | B62J 1/06 | 297/215.13 |
| 8,177,251 B2 * | 5/2012 | Shirai | B62J 1/08 | 280/288.4 |
| 8,308,124 B2 * | 11/2012 | Hsu | B62J 1/08 | 248/161 |
| 8,317,261 B2 * | 11/2012 | Walsh | B62J 1/10 | 297/215.13 |
| 8,550,551 B2 * | 10/2013 | Shirai | B62K 19/36 | 280/221 |
| 8,833,848 B2 * | 9/2014 | Shirai | B62K 19/36 | 280/226.1 |
| 2002/0011129 A1 * | 1/2002 | Petrak | B60T 7/08 | 74/502.6 |
| 2004/0208687 A1 * | 10/2004 | Sicz | B62J 1/08 | 403/109.3 |
| 2005/0145444 A1 * | 7/2005 | Petrak | B60T 7/08 | 188/2 D |
| 2006/0053939 A1 * | 3/2006 | Basile | F16C 1/22 | 74/501.5 R |
| 2006/0175792 A1 * | 8/2006 | Sicz | B62J 1/06 | 280/200 |
| 2008/0257099 A1 * | 10/2008 | Prat Terrades | F16C 1/22 | 74/502.6 |
| 2009/0100958 A1 * | 4/2009 | Basile | F16C 1/22 | 74/501.5 R |
| 2009/0175676 A1 * | 7/2009 | Ficyk | F16C 1/101 | 403/123 |
| 2010/0207351 A1 * | 8/2010 | Klieber | B62K 19/36 | 280/278 |
| 2011/0057485 A1 * | 3/2011 | Shirai | B62J 1/08 | 297/199 |
| 2011/0187166 A1 * | 8/2011 | Walsh | B62J 1/06 | 297/215.13 |
| 2011/0257848 A1 * | 10/2011 | Shirai | B62K 19/36 | 701/49 |
| 2012/0104809 A1 * | 5/2012 | Hsu | B62J 1/08 | 297/215.13 |
| 2012/0104810 A1 * | 5/2012 | Walsh | B62K 19/36 | 297/215.13 |
| 2013/0156492 A1 * | 6/2013 | Maier | B62J 1/08 | 403/109.7 |
| 2013/0300163 A1 * | 11/2013 | Shirai | B62K 19/36 | 297/215.13 |
| 2013/0307299 A1 * | 11/2013 | Winefordner | B62J 1/08 | 297/215.13 |
| 2014/0112703 A1 * | 4/2014 | Chen | B62J 1/08 | 403/109.2 |

FOREIGN PATENT DOCUMENTS

| | | | | |
|---|---|---|---|---|
| DE | 10315692 A1 * | 11/2004 | | F16C 1/101 |
| EP | 0774591 A2 * | 5/1997 | | F16C 1/22 |
| EP | 0774591 A3 * | 1/1998 | | F16C 1/22 |
| EP | 0774591 B1 * | 8/2001 | | F16C 1/22 |
| EP | 2457811 A1 * | 5/2012 | | B62J 1/08 |
| EP | 2457811 B1 * | 10/2013 | | B62J 1/08 |
| GB | 136912 A * | 12/1919 | | F16C 1/226 |
| GB | 360111 A * | 11/1931 | | B62K 19/36 |

* cited by examiner

BICYCLE SEATPOST ASSEMBLY WITH CABLE CONNECTING DEVICE

BACKGROUND

Bicycling is becoming an increasingly popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seatpost assembly.

Additionally, previous bicycle implementations have used only a single control cable to connect a component such as the brakes to an operating device, allowing the user to actuate the component via the operating device. In these implementations, the control cable only has a single nipple portion on one end of the cable. Consequently, either the operating device or the component being actuated must be able to engage with the end of the control cable that does not have a nipple portion, often requiring a clamp mechanism. Such a clamp mechanism can be inconvenient because tools are required for attaching and adjusting the control cable.

SUMMARY

To address the above issues, a bicycle seatpost assembly with a cable connecting device is provided. According to a first aspect of the invention, the bicycle seatpost assembly may comprise a first cylinder, a second cylinder configured to be telescopically received in the first cylinder, a positioning structure configured to relatively position the first cylinder and the second cylinder, an operating device configured to be mounted to a bicycle and operatively coupled to the positioning structure, and a control cable. The control cable may comprise an outer casing, a first cable having a first end and a second end, the first cable configured to be operatively connected to the positioning structure at the first end, and a second cable having a third end and a fourth end, the second cable configured to be operatively connected to the operating device at the third end. The bicycle seatpost assembly may additionally comprise a cable connecting device configured to connect the second end of the first cable and the fourth end of the second cable. One potential advantage of this configuration is improved user experience by eliminating the need for tools to attach the first and second cable to the positioning structure and operating device respectively.

In the first aspect, the positioning structure includes an actuator configured to actuate the positioning structure in response to an operation of the operating device, and the actuator includes a cable attachment portion disposed inside a frame of the bicycle in a state where the first cylinder is received in a seat tube of the frame. This configuration provides the potential advantage of improved ease of use of the bicycle seatpost assembly by allowing the positioning structure to be actuated via a cable that can be optimally positioned for the user.

In the first aspect, the cable connecting device includes a cable tension adjuster to adjust a tension of the first cable and the second cable that are connected to each other by the cable connecting device. This configuration provides the potential advantage of allowing the user to more easily adjust the tension of the control cables without tools.

In the first aspect, the cable connecting device includes an outer casing receiving portion configured to receive the outer casing. This configuration provides the potential advantage of securely receiving the outer casing for a more robust connection between the cables and the cable connecting device.

In the first aspect, the first end of the first cable includes a first nipple and the actuator includes a first nipple hooked portion to be hooked by the first nipple of the first cable. This configuration provides the potential advantage of improved user experience as the first nipple can be hooked onto the first nipple hooked portion without the need for tools.

In the first aspect, the third end of the second cable includes a second nipple to be engaged with the operating device and the operating device includes a second nipple hooked portion to be hooked by the second nipple of the second cable. This configuration provides the potential advantage of improved user experience as the second nipple can be hooked onto the second nipple hooked portion without the need for tools.

In the first aspect, the cable connecting device includes a holding member to hold a first inner wire of the first cable and a second inner wire of the second cable, and a housing configured to accommodate the holding member such that the holding member moves inside the housing. One potential advantage of this configuration is that the holding member can move inside the housing to automatically balance a tension between the first inner wire of the first cable and a second inner wire of the second cable.

In the first aspect, the cable connecting device is disposed outside a frame of the bicycle. One potential advantage of this configuration is improved user experience by allowing the user to easily reach and adjust the cable connecting device.

In the first aspect, the operating device includes a first operated member configured to operate the positioning structure and a second operated member configured to operate a bicycle transmission. This configuration provides the potential advantage of increased ease of use by allowing the user to operate both the positioning structure and the bicycle transmission through a single operating device.

According to a second aspect of the invention, a cable connecting device for connecting a first cable and a second cable, the first cable having a first end and a second end, the second cable having a third end and a fourth end, the cable connecting device may comprise a first cable stopper to hold the second end of the first cable, and configured to prevent the first cable from moving in a first direction and to allow the first cable to move in a second direction opposite the first direction. This configuration provides the potential advantage of facilitating the connection of two control cables.

In the second aspect, the cable connecting device further comprises a second cable stopper to hold the forth end of the second cable and configured to prevent the second cable from moving in the second direction and to allow the second cable to move in the first direction This configuration provides the potential advantage of simultaneously allowing easy attachment of the control cables to the cable connecting device while also preventing the control cables from slipping out of the cable connecting device.

In the second aspect, the cable connecting device further comprises a holding member to accommodate the first cable stopper and the second cable stopper, such that the first cable stopper and the second cable stopper align with each other inside the holding member. This configuration provides the potential advantage of more robustly aligning the cable stoppers.

In the second aspect, the first cable stopper includes a first release pin to release the first cable from the first cable stopper so as to be movable in the first direction inside the first cable stopper. This configuration provides the potential advantage of increased ease of use by allowing the user to release the first cable from the first cable stopper by actuating a release pin rather than using tools.

In the second aspect, the first cable stopper includes a first release pin to release the first cable from the first cable stopper so as to be movable in the first direction inside the first cable stopper, and the second cable stopper includes a second release pin to release the second cable from the second cable stopper so as to be movable in the second direction inside the second cable stopper. This configuration provides the potential advantage of increased ease of use by allowing the user to release the first and second cables from the first and second cable stoppers by actuating a release pin rather than using tools.

In the second aspect, the holding member includes an opening disposed at a peripheral surface of the holding member, the first cable stopper and the second cable stopper being configured to be detachable from the holding member via the opening. This configuration provides the potential advantage of increased ease of use by allowing the user to more easily detach the first and second cable stoppers from the holding member.

In the second aspect, the cable connecting device further comprises a housing configured to accommodate the holding member such that the holding member moves inside the housing. One potential advantage of this configuration is that the holding member can move inside the housing to automatically balance a tension between the first inner wire of the first cable and a second inner wire of the second cable.

In the second aspect, the cable connecting device further comprises a cable tension adjuster to adjust a tension of the first cable and the second cable that are connected to each other by the cable connecting device, and configured to accommodate the holding member together with the housing. This configuration provides the potential advantage of allowing the user to more easily adjust the tension of the control cables without tools.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
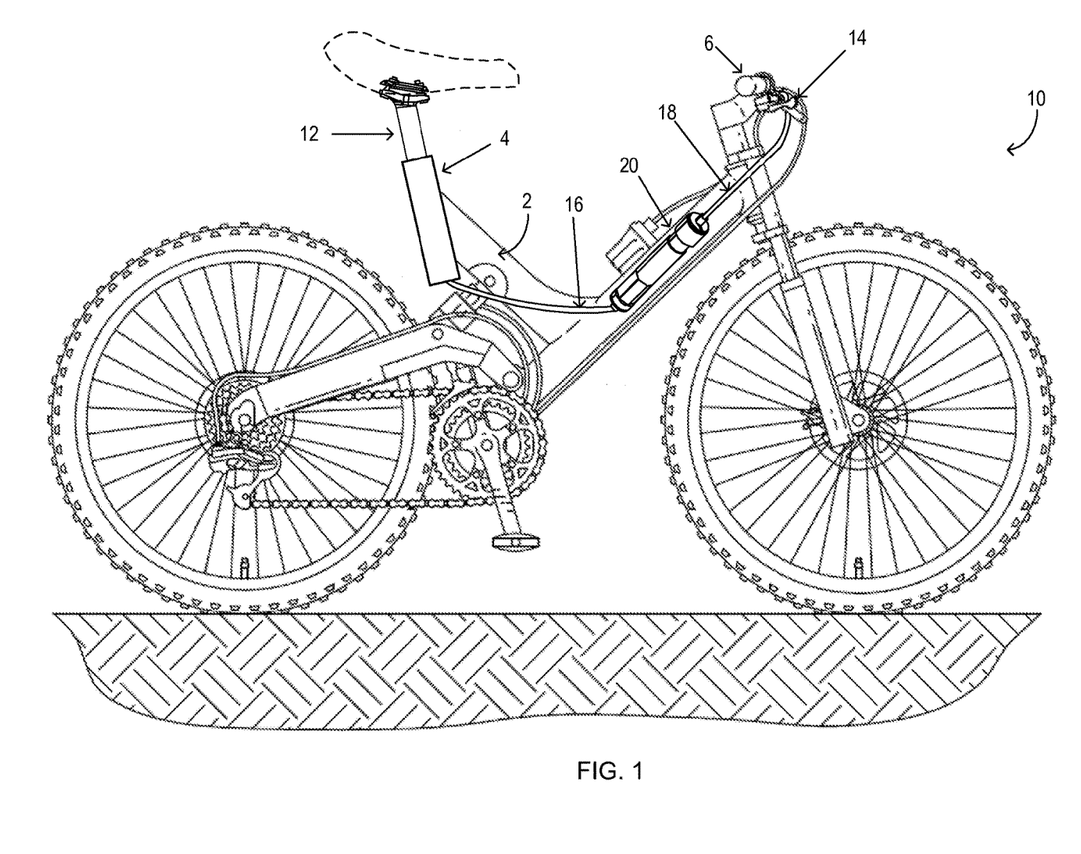
FIG. 1 illustrates a bicycle that includes a bicycle seatpost assembly and cable connecting device.

Referring initially to FIG. 1, an exemplary bicycle 10 that includes a bicycle seatpost assembly 12 and cable connecting device 20 according to one disclosed embodiment of the present disclosure is shown. It will be appreciated that while FIG. 1 illustrates a mountain bike, other forms of bicycles are possible. Bicycle seatpost assembly 12 is detachably attached to a bicycle frame 2 of the bicycle 10. As illustrated in FIG. 1, the bicycle seatpost assembly 12 may be detachably attached to a seat tube 4 of the bicycle frame 2. When detachably attached to seat tube 4, a portion of the bicycle seatpost assembly 12 may rest inside and be contained within seat tube 4. In order to adjust a height of the bicycle seatpost assembly, a user may operate the bicycle seatpost assembly 12 via an operating device 14. The operating device 14 may be mounted to a handlebar 6 of the bicycle 10. The operating device 14 is operatively connected to the bicycle seatpost assembly by a first control cable 16, a second control cable 18, and cable connecting device 20. It will be appreciated that bicycle 10 illustrated in FIG. 1 may include other structures well known in the bicycle field such as pedals and a bicycle transmission. For the sake of clarity and brevity, these structures that are well known in the bicycle field will not be described and/or illustrated in detail.

Figure 2:
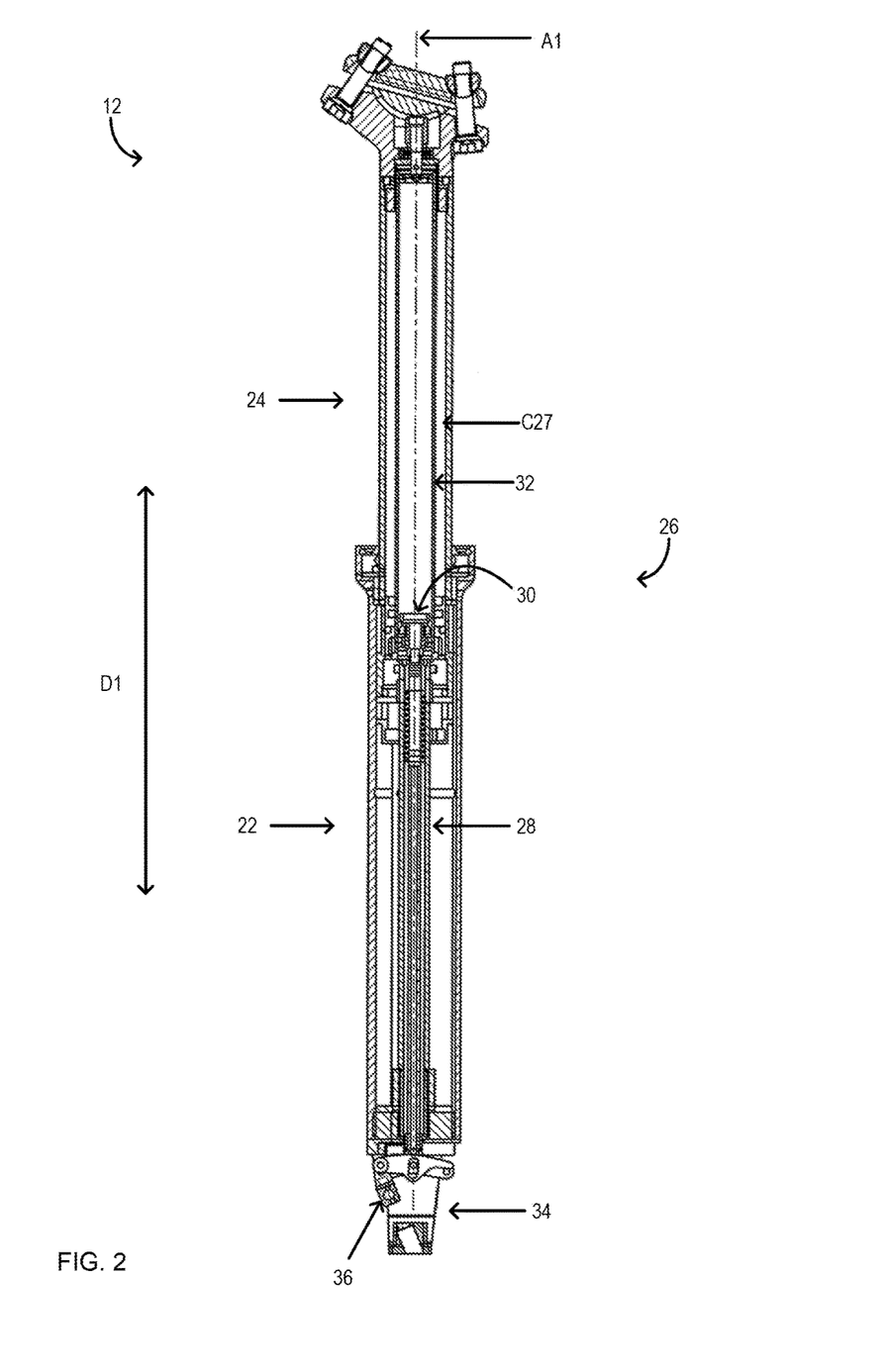
FIG. 2 illustrates a cross-section of the bicycle seatpost assembly of FIG. 1.

Now turning to FIG. 2, a cross section of bicycle seatpost assembly 12 is illustrated. The bicycle seatpost assembly 12 comprises a first cylinder 22, a second cylinder 24, a positioning structure 26, and an actuator 34. As shown in FIG. 2, the second cylinder 24 is telescopically received in the first cylinder 22, and is configured to be telescopically movable relative to the first cylinder 22 in an axial direction D1 of the first cylinder 22. The axial direction D1 is defined to be parallel to a center axis A1 of the first cylinder 22.

The positioning structure 26 is configured to relatively position the first cylinder 22 and the second cylinder 24. The positioning structure 26 includes a first inner tube 28 that is contained within the first cylinder 22, a second inner tube 32 that is contained within the second cylinder 24, and a valve structure 30 that is configured to switch a state of the bicycle seatpost assembly 12 between an adjustable state and a locked state. The first inner tube 28 and the second inner tube 32 may extend in the axial direction D1 during adjustment of the bicycle seatpost assembly 12. In the adjustable state, the first cylinder 22 and the second cylinder 24 are telescopically movable relative to each other in the axial direction D1. In the locked state, the first cylinder 22 and the second cylinder 24 are fixed into their current position relative to each other in the axial direction D1.

As illustrated in FIG. 2, the positioning structure 26 includes an actuator 34 that is configured to actuate the valve structure 30, switching a state of the bicycle seatpost assembly 12 between the adjustable state and the locked state. The actuator 34 includes a cable attachment portion 36 and may be located on a lower end of the first cylinder 22. Now taking FIG. 1 into consideration, when the bicycle seatpost assembly 12 is detachably attached to the bicycle frame 2, the first cylinder 22 of the bicycle seatpost assembly 12 is received in the seat tube 4 of the bicycle frame 2. In this state where the first cylinder 22 is received in the seat tube 4 of the bicycle frame 2, the cable attachment portion 36 that is located on the lower end of the first cylinder 22 is disposed inside the bicycle frame 2, more specifically inside seat tube 4. It will be appreciated that even in the configuration where the cable attachment portion 36 of the actuator 34 is disposed inside the bicycle frame 2, the first cable 16 may still be attached to cable attachment portion 36, allowing for actuator 36 to be operatively connected to the operating device 14.

The positioning structure 26 includes a biasing structure to generate a biasing force such that the first cylinder 22 and the second cylinder 24 are telescopically moved relative to each other. In the illustrated embodiment, the biasing structure includes a biasing chamber C27 that is configured to be filled with a compressible fluid to generate the biasing force such that the first cylinder 22 and the second cylinder 24 are telescopically moved away from each other. The biasing chamber C27 is configured to generate the biasing force such that a total length of the bicycle seatpost assembly 12 increases. In the embodiment illustrated in FIG. 2, the compressible fluid is applied to the biasing structure of the positioning structure 26, however it will be appreciated that other biasing structures such as a spring can be applied in addition to or instead of the compressible fluid.

Figure 3A:
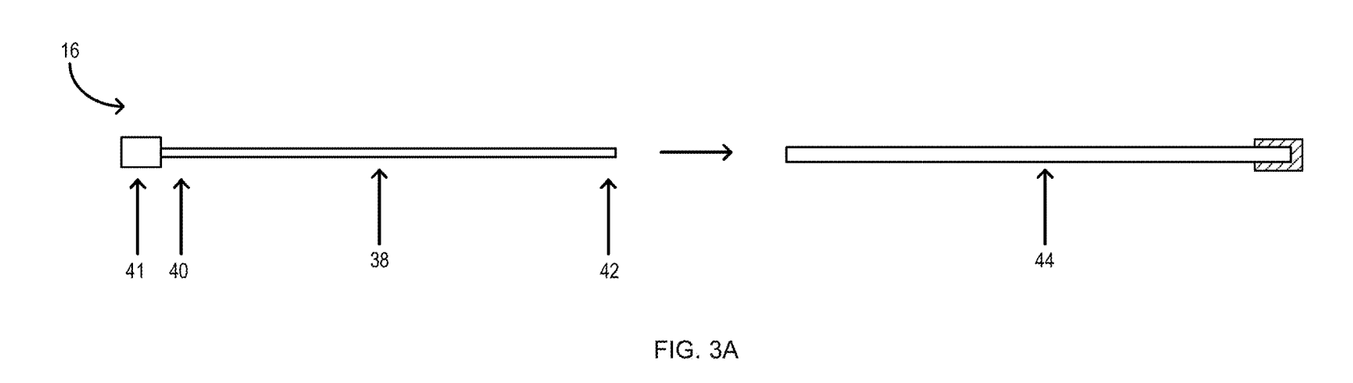
FIGS. 3A and 3B are more detailed illustrations of the control cables shown in FIG. 1.

Now turning to FIG. 3A, the first cable 16 has a first end 40, a first inner wire 38, and a second end 42. The first end 40 includes a first nipple 41 that is configured to hook onto a nipple hooked portion. This nipple and nipple hooked portion configuration allows for easy attachment and detachment of the first cable 16 to the actuator 34 of the bicycle seatpost assembly 12, without the need for tools. However, the second end 42 of the first cable 16 does not have a nipple portion because it is configured to be inserted into a first outer casing 44, such that a substantial portion of the first inner wire 38 will be contained within the first outer casing 44. In a configuration where only the first cable 16 is used to operatively connect the actuator 34 to the operating device 14, the second end 42 of the first cable 16 would need to be an operating lever of the operating device 14. However, as the second end 42 does not have a nipple portion, attaching the second end 42 to the operating device 14 may require tools to clamp the second end 42 into place in the operating device 14.

Figure 3B:
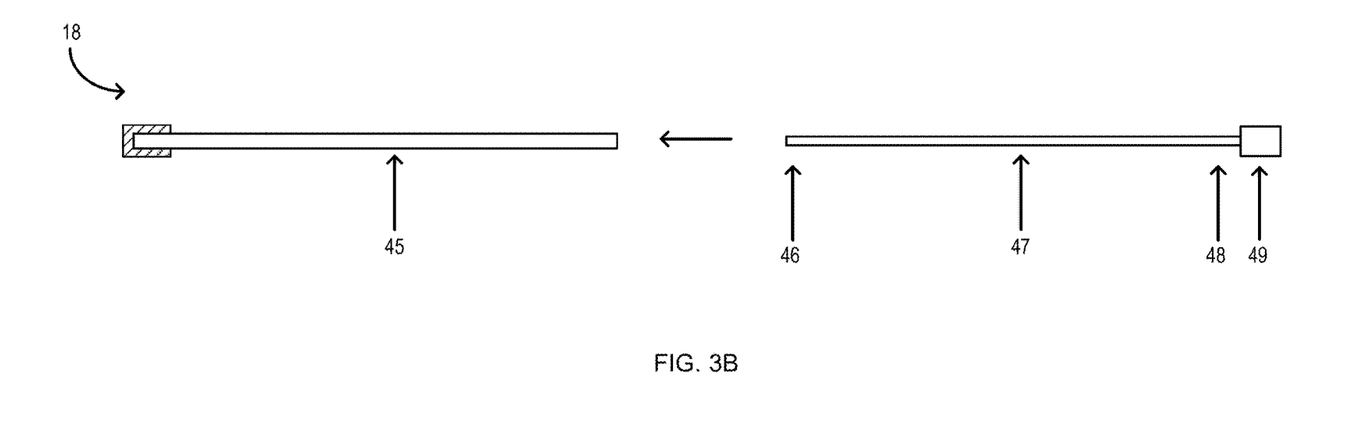

Accordingly, rather than using only one cable, the configuration illustrated in FIG. 1 includes both a first cable 16 and a second cable 18. Similarly to the first cable 16, the second cable 18 has a third end 48, a second inner wire 47, and a fourth end 46 as shown in FIG. 3B. The third end 48 includes a second nipple 49 that is configured to hook onto a nipple hooked portion of the operating device 14 and the fourth end 46 is configured to be inserted into a second outer casing 45, such that a substantial portion of the second inner wire 47 will be contained within the second outer casing 45. By using both a first cable 16 and a second cable 18 as shown in FIGS. 3A and 3B, the nipple and nipple hooked portion configuration that alleviates the need for tools can be utilized at both the actuator 34 and the operating device 14.

Figure 4:
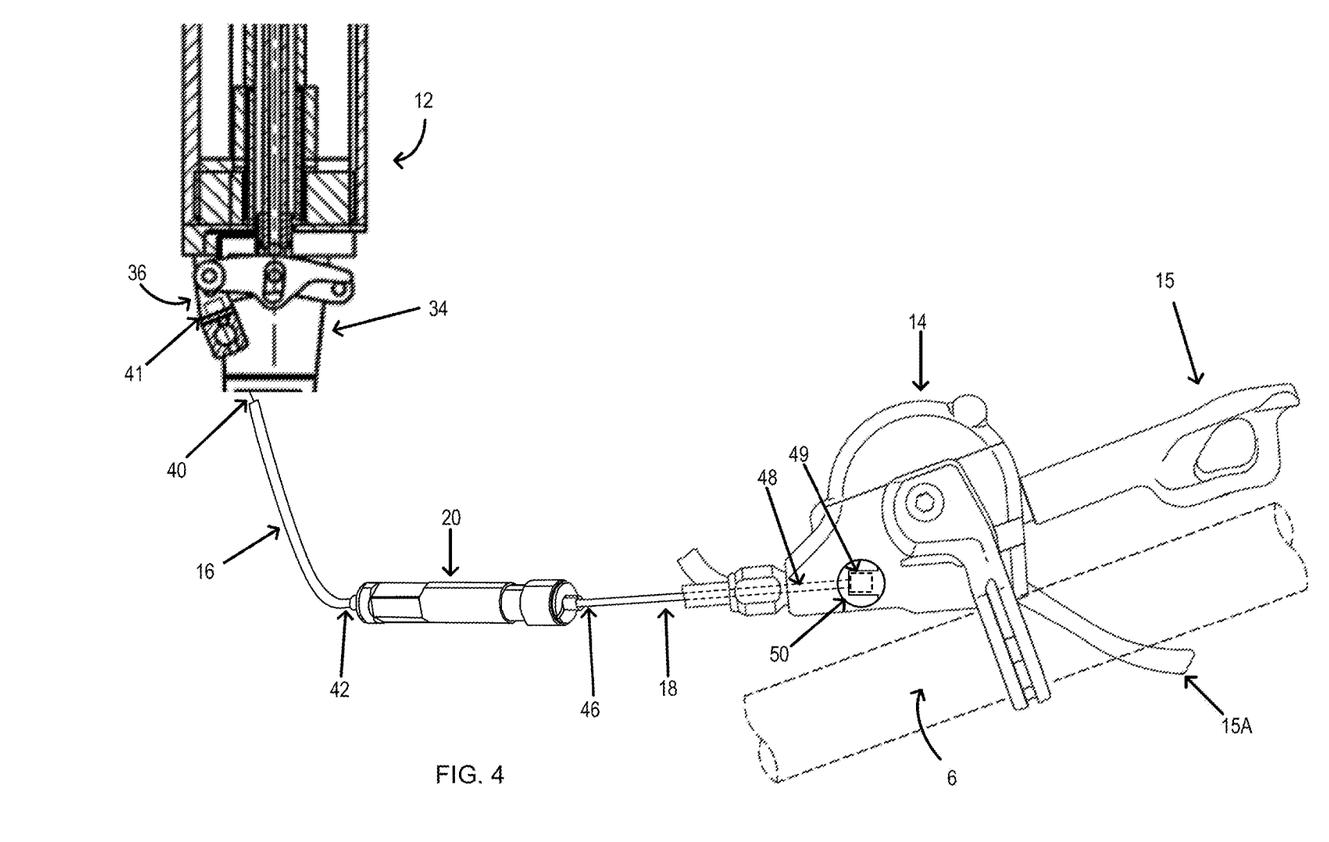
FIG. 4 is a more detailed illustration of the operative connection between the bicycle seatpost assembly and the operating device in FIG. 1.

As illustrated in FIG. 4, the first end 40 of the first cable 16 is attached to the actuator 34 by hooking the first nipple 41 onto the first nipple hooked portion 36 of the actuator 34. Additionally, the third end 48 of the second cable 18 is configured to be engaged with the operating device 14 by hooking the second nipple 49 onto the second nipple hooked portion 50 of the operating device 14. To operatively connect the actuator 34 to the operating device 14, the first cable 16 and the second cable 18 need to be connected to each other. Accordingly, a cable connecting device 20 is configured to connect the second end 42 of the first cable 16 to the fourth end 46 of the second cable 18. With this configuration, the positioning structure 26 of the bicycle seatpost assembly 12 can be operated via a first operated member 15 of the operating device 14. It will be appreciated that while the first operated member 15 as illustrated in FIG. 4 uses a lever mechanism, any suitable mechanism such as a button mechanism may be used in addition to or instead of the illustrated lever mechanism. Additionally, it will be appreciated that the operating device 14 may include additional operated members. For example, another embodiment of the operating device 14 may include a first operated member 15 configured to operate the positioning structure 26 and a second operated member 15A configured to operate a bicycle transmission (not shown).

Figure 5:
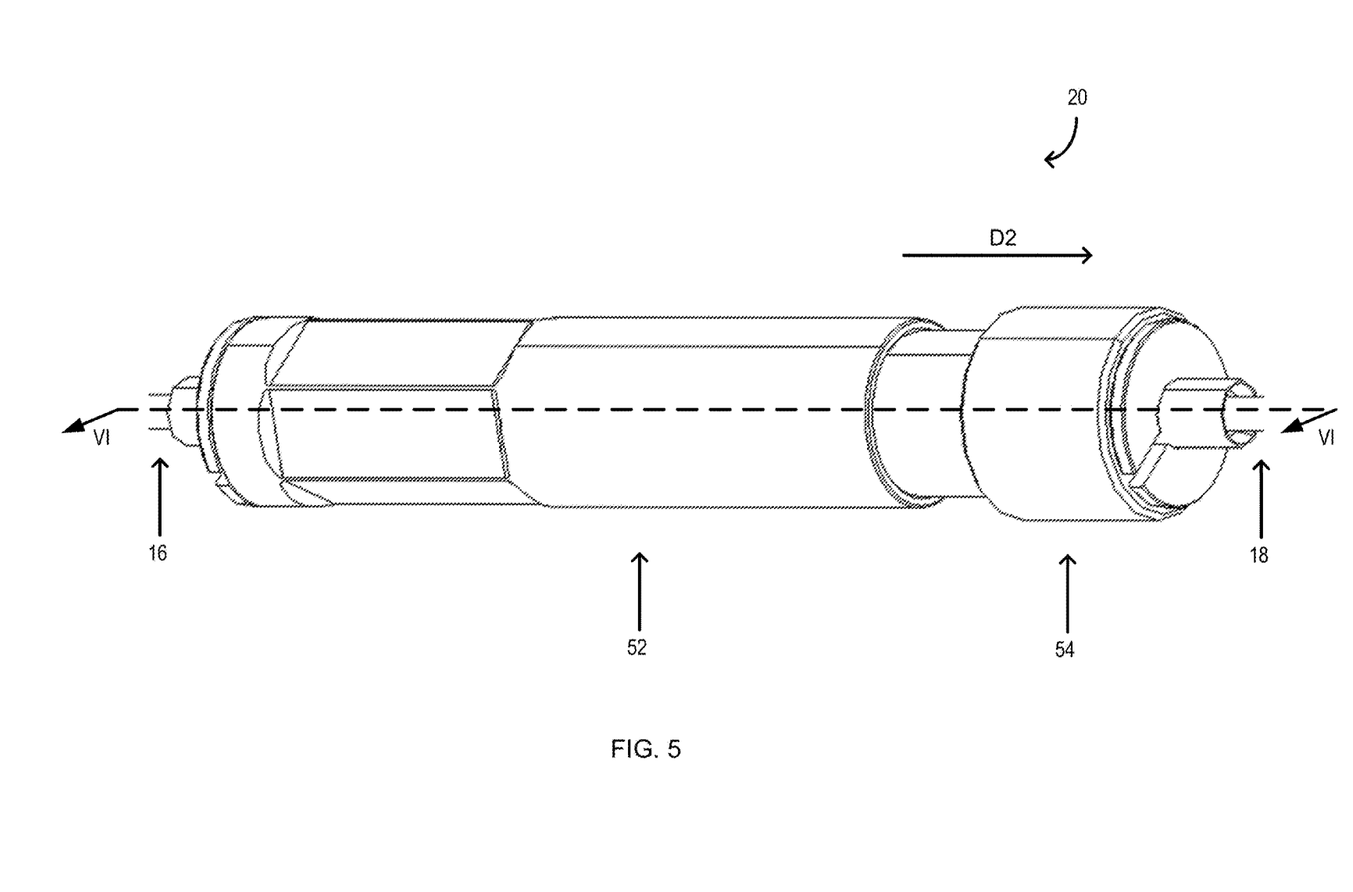
FIG. 5 is a more detailed illustration of the cable connecting device of FIG. 1.

Now turning to FIG. 5, the cable connecting device 20 is configured to connect the second end 42 of the first cable 16 and the fourth end 46 of the second cable 18. As illustrated, the cable connecting device includes a housing 52 and a cable tension adjuster 54 to adjust a tension of the first cable 16 and the second cable 18 that are connected to each other by the cable connecting device 20. In one embodiment, the cable tension adjuster 54 can be extended outward in a direction D2, effectively increasing the total length of the cable connecting device 20. As the tension on the first inner wire 38 of the first cable 16 and the second inner wire 47 of the second cable 18 is determined by the total length of the first inner wire 38 and the second inner wire 47 compared to the total length of the first outer casing 44, the second outer casing 45, and the cable connecting device 20, adjusting the total length of the cable connecting device will also adjust the tension on the first inner wire 38 of the first cable 16 and the second inner wire 47 of the second cable 18. Accordingly, the cable tension adjuster 54 can be extended outward to increase the tension of the first and second cables, and conversely the cable tension adjuster 54 can be retracted back into the cable connecting device 20 to decrease the tension of the first and second cable.

Figure 6:
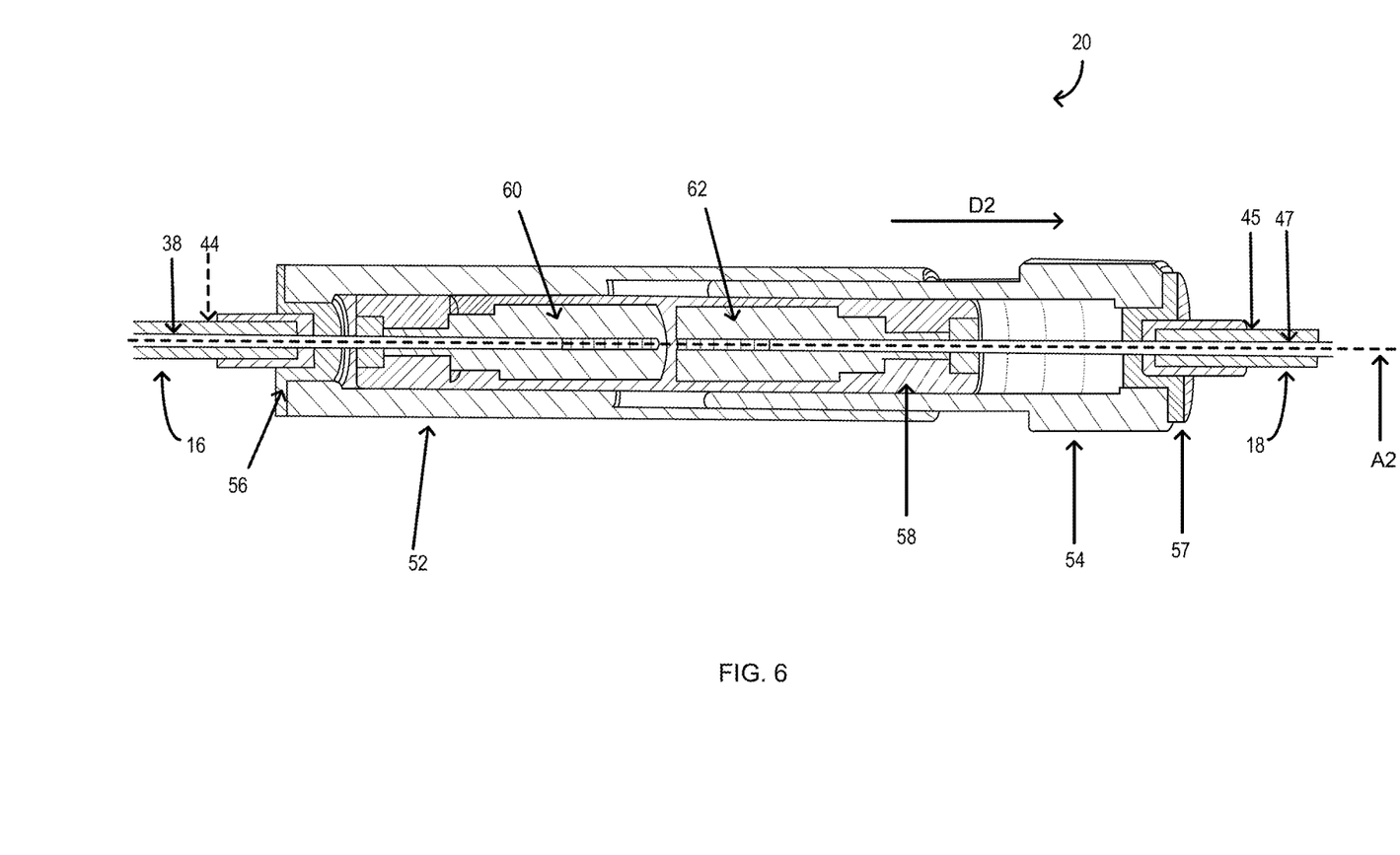
FIG. 6 illustrates a cross-section of the cable connecting device of FIG. 1, taken from the cross-sectional line VI of FIG. 5.

FIG. 6 illustrates a cross-section of the cable connecting device 20. The cable connecting device 20 includes a first outer casing receiving portion 56 that is configured to receive the first outer casing 44 of the first cable 16 and a second outer casing receiving portion 57 that is configured to receive the second outer casting 45 of the second cable 18. As shown in FIG. 6, the first inner wire 38 of the first cable 16 passes through the first outer casing 44 and continues into the cable connecting device 20. Similarly, the second inner wire 47 of the second cable 18 passed through the second outer casing 45 and continues also continues into the cable connecting device 20.

As shown in FIG. 6, the cable connecting device 20 includes a holding member 58 to hold the first inner wire 38 of the first cable 16 and the second inner wire 47 of the second cable 18. The holding member 58 may be configured to contain a first cable stopper 60 and a second cable stopper 62. The holding member 58 may be additionally configured to accommodate the first cable stopper 60 and the second cable stopper 62 such that the first cable stopper 60 and the second cable stopper 62 are aligned with each other inside the holding member 58 along an axis A2 extending along a longitudinal direction of the cable connecting device 20. As illustrated in FIG. 6, the first inner wire 38 passes through the first outer casing 44, into the cable connecting device 20, and is held inside the holding member 58 by the first cable stopper 60. Similarly, the second inner wire 47 passes through the second outer casing 45, into the cable connecting device 20, and is held inside the holding member 58 by the second cable stopper 62. Additionally, the housing 52 and the cable tension adjuster 54 together may be configured to accommodate the holding member 58 such that the holding member 58 can move inside the housing 52 and the cable tension adjuster 54 along the axis A2. This configuration allows the holding member 58 to move along the axis A2 to equalize the tension between the first inner wire 38 and the second inner wire 47.

Accordingly, taking into consideration FIG. 4, when the first operated member 15 of the operating device 14 is actuated, the second inner wire 47 of the second cable 18 is pulled by the mechanism of the first operated member 15, thereby transmitting an operation force to the holding member 58 via the second inner wire 47. This force transmitted from the second inner wire 47 causes the holding member 58 to move along the axis A2 towards the direction of the second cable 18, thus transmitting the force to the first inner wire 38. The force from the first inner wire 38 pulls on the nipple hooked portion 36 of the actuator 34, thus actuating the positioning structure 26 of the bicycle seatpost assembly 12 and switching the bicycle seatpost assembly 12 into an adjustable state.

Figure 7A:
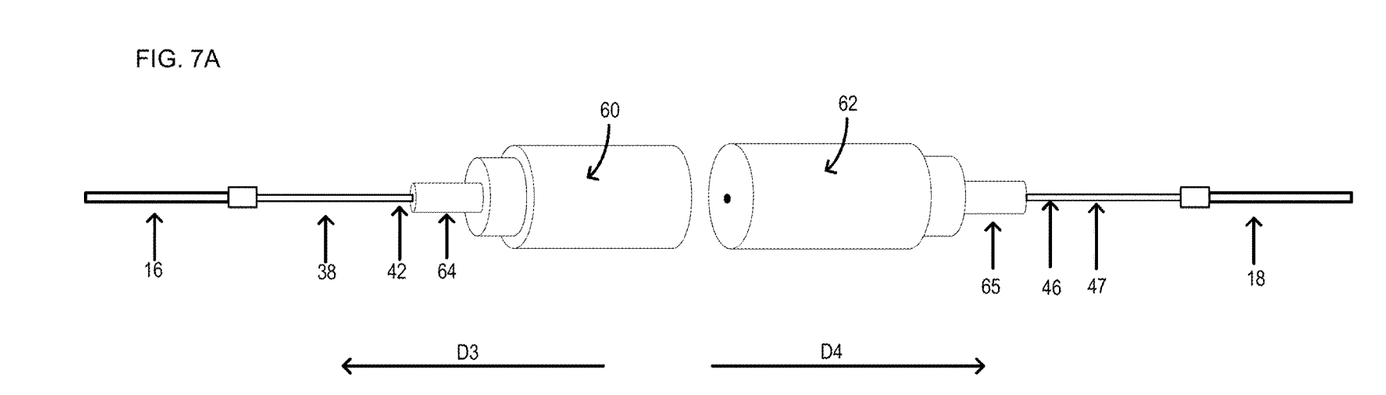
FIGS. 7a and 7b are more detailed illustrations of the housing and cable stoppers for FIG. 6.

Now turning to FIG. 7A, first cable stopper 60 holds the second end 42 of the first cable 16. The first cable stopper 60 is configured to prevent the first cable 16 from moving in a first direction D3 and to allow the first cable 16 to move in a second direction D4 that is the opposite direction to the first direction D3. This configuration allows the first inner wire 38 to be inserted into the first cable stopper 60 in the second direction D4, but prevents the first inner wire 38 from being pulled back out of the first cable stopper 60 in the first direction D3. Similarly, the second cable stopper 62 holds the forth end 46 of the second cable 18 and is configured to prevent the second cable 18 from moving in the second direction D4 and to allow the second cable to move in the first direction D3. This configuration allows the second inner wire 47 to be inserted into the second cable stopper 62 in the first direction D3, but prevent the second inner wire 47 from being pulled back out of the second cable stopper 62 in the second direction D4.

Additionally, the first cable stopper 60 includes a first release pin 64 to release the first cable 16 from the first cable stopper 60 so as to be movable in the first direction D3 inside the first cable stopper 60. When the first release pin 64 is actuated, the first cable stopper 60 releases its hold on the first inner wire 38, thus allowing the first cable 16 to move in the first direction D3, and be pulled back out of the first cable stopper 60. Similarly, the second cable stopper 62 includes a second release pin 65 to release the second cable 18 from the second cable stopper 62 so as to be movable in the second direction D4 inside the second cable stopper 62. When the second release pin 65 is actuated, the second cable stopper 62 releases its hold on the second inner wire 47, thus allowing the second cable 18 to move in the second direction D4, and be pulled back out of the second cable stopper 62.

Figure 7B:
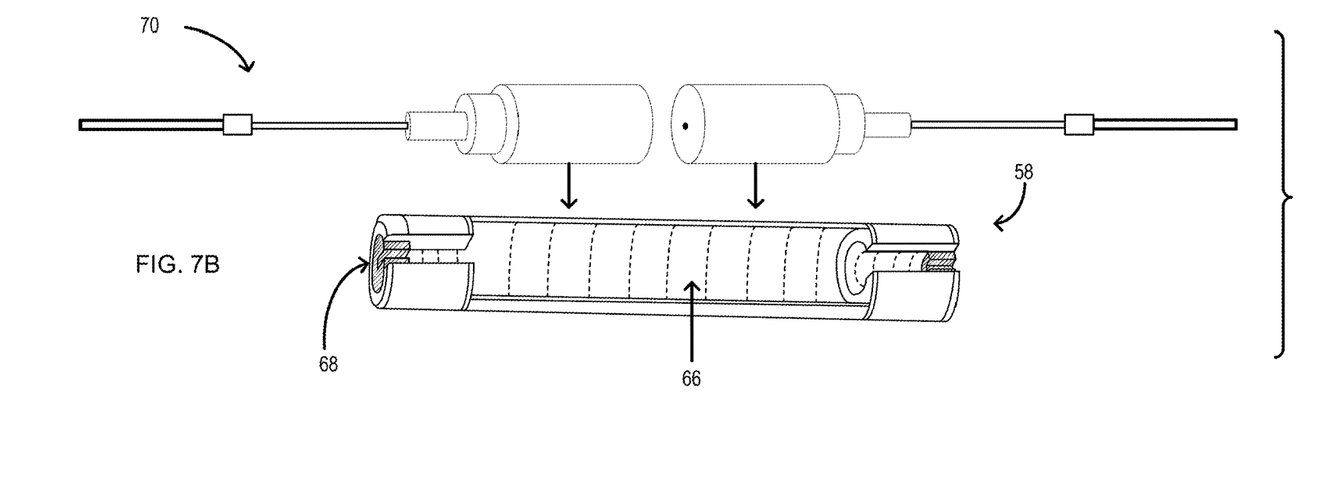

Now turning to FIG. 7B, which shows an exploded view 70 of the cable stoppers 60, 62 and holding member 58 of the cable connecting device 20, the holding member 58 includes an opening 66 disposed at a peripheral surface of the holding member 58. The first cable stopper 60 and the second cable stopper 62 are configured to be able to be inserted into the holding member 58 through the opening 66, and are additionally configured to be detachable from the holding member 58 via the opening 66. The holding member 58 may additionally include an elastic member 68 that is configured to support the first inner wire 38 and the second inner wire 47.

The ordinal numbers such as "first" and "second", as used herein, are intended to merely be identifiers and do not denote other meanings such as a particular order or number of components. For example, the term "first cable stopper" itself does not imply an existence of a "second cable stopper", and the term "second cable stopper" itself does not imply an existence of a "first cable stopper".

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

While specific embodiments of the cable connecting device have been described in detail, the particular arrangements disclosed are meant to be illustrative only and not limiting. The features of the various embodiments described above, as well as modifications thereof, may be variously combined without departing from the scope of this disclosure.

The invention claimed is:

1. A seatpost assembly for a bicycle, the seatpost assembly comprising:
   a first cylinder;
   a second cylinder configured to move telescopically with respect to the first cylinder;
   a positioner configured to position the second cylinder with respect to the first cylinder;
   an operator configured to be mounted to the bicycle via a mount and operatively coupled to the positioner via a control cable, the control cable including:
      an outer casing including a first outer casing and a second outer casing;
      a first cable having a first end and a second end, the first cable configured to be operatively connected to the positioner at the first end; and
      a second cable having a third end and a fourth end, the second cable configured to be operatively connected to the operator at the third end; and
   a cable connector that connects the second end of the first cable and the fourth end of the second cable via insertion of the second end into the first outer casing and the fourth end into the second outer casing,
   wherein the cable connector includes
      a holding member configured to hold in place the second end and the fourth end with respect to each other within the holding member; and
      a cable tension adjuster to adjust a tension of the first cable and the second cable that are connected to each other by the cable connector, the cable tension adjuster extendable outward in a direction along an axis of the cable connector, thus increasing a total length of the cable connector.

2. The seatpost assembly according to claim 1, wherein
the positioner includes an actuator that actuates the positioner via a valve structure, the actuator configured to actuate the positioner in response to an operation of the operator; and
the actuator includes a cable attachment inside a frame of the bicycle where the first cylinder is in a seat tube of the frame.

3. The seatpost assembly according to claim 2, wherein
the first end of the first cable includes a first nipple and the actuator includes a first nipple hooked portion hooked by the first nipple of the first cable.

4. The seatpost assembly according to claim 1, wherein
the cable connector includes an outer casing receiver that receives the outer casing.

5. The seatpost assembly according to claim 1, wherein
the third end of the second cable includes a second nipple engaged with the operator and the operator includes a second nipple hooked portion hooked by the second nipple of the second cable.

6. The seatpost assembly according to claim 1, wherein the cable connector includes:
the holding member holding a first inner wire of the first cable and a second inner wire of the second cable; and
a housing that accommodates the holding member such that the holding member is movable inside the housing along an axis of the housing.

7. The seatpost assembly according to claim 1, wherein the cable connector is not disposed within a frame of the bicycle.

8. The seatpost assembly according to claim 1, wherein
the operator includes a first operator that operates the positioner via the first and second cables and a second operator that operates a bicycle transmission via a mechanical connection.

9. The seatpost assembly of claim 1, further comprising a first inner tube that is contained within the first cylinder and a second inner tube that is contained within the second cylinder that moves over the first inner tube, wherein
the second cylinder is configured to move telescopically with respect to the first cylinder via the second inner tube that moves over the first inner tube.

10. The seatpost assembly of claim 1, further comprising a first inner tube, a second inner tube, and a valve structure, wherein the positioner comprises the first inner tube, the second inner tube, and the valve structure, the second inner tube configured to move over the first inner tube such that the second cylinder is positioned with respect to the first cylinder.

* * * * *